Patented Apr. 20, 1943

2,317,297

UNITED STATES PATENT OFFICE 2,317,297

DENTIFRICE

Allen Llewellyn Omohundro, Wilton, and Emil Conrad Fanto, Fairfield, Conn., assignors to McKesson & Robbins, Incorporated, Bridgeport, Conn., a corporation of Maryland No Drawing. Application October 5, 1940, Serial No. 359,966

7 Claims. (Cl. 167—93)

This invention relates to improvements of dentifrices, especially of toothpowders containing active oxygen or hydrogen peroxide liberating ingredients such as peroxides, percarbonates, perborates of the alkali and alkaline earth metals or complex compounds containing hydrogen peroxide with salts of the alkali or alkaline earth metals.

The undesirable feature of dentifrices containing the above mentioned oxygen releasing ingredients, to hydrolyze with water to form strong alkaline solutions, is a disturbing factor in the use of such dentifrices. Several patents have been issued to remedy this basicity by adding ingredients of acid character to neutralize the alkalinity, but without complete success.

This invention concerns the use of a well known acidic ingredient, boric acid, in the presence of certain solid members of the polyhydric alcohol series, such as mannitols, sorbitols, etc. One of the most commonly used active oxygen releasing ingredients in toothpowders is sodium perborate, which will serve as an example. The addition of water to sodium perborate in a toothpowder will cause the formation of sodium hydroxide.

Since mixtures containing sodium perborate tetrahydrate—the most used commercial form of sodium perborate—and boric acid tends to cake badly and even liquify, it is necessary to use the sodium perborate monohydrate modification. After all of the sodium hydroxide has been neutralized any excess boric acid present will act in conjunction with the borax formed, as a buffer, maintaining a substantially constant pH value in the mouth. By adding the proper amount of boric acid, the pH can be maintained at a desirable value, i. e. between a pH level of 8 to 9.

In order to use the least amount of boric acid as an ingredient of a toothpowder, it is necessary to add one of the above mentioned polyhydric alcohols. These alcohols are known to react with boric acid to form a complex which is a stronger acid than boric acid itself, hence a more efficient neutralizer.

The hexahydric alcohol series, of which mannitol is a member, is now prepared commercially on a large scale, and economically enough to warrant its use.

In general, the greater the amount of mannitol used in a dentifrice, the smaller is the amount of boric acid required to obtain a given pH. This is illustrated by the following practical examples.

|  | Dentifrices | | |
|---|---|---|---|
|  | #1 | #2 | #3 |
|  | Parts | Parts | Parts |
| Abrasive powder | 78 | 75 | 87 |
| Sodium perborate monohydrate | 7 | 7 | 7 |
| Saponaceous ingredient | 6 | 6 | 6 |
| Boric acid U. S. P | 9 | 4 | |
| Mannitol | | 8 | |
|  | pH | pH | pH |
| 10% of dentifrice in suspension | 8.3 | 8.3 | 10.0 |
| 30% of dentifrice in suspension | 7.8 | 7.8 | 10.0 |

It is apparent from the above chart that a dentifrice containing 7% sodium perborate monohydrate without any acidic ingredients is strongly alkaline, having a pH value of 10.1. The addition of 9% boric acid will produce a corresponding decrease in pH values—from pH 10 to pH 7.8–8.3—representing mild alkalinity (Dentifrice #1). This high percentage of boric acid is not desirable in any dentifrice. Consequently, in order to reduce the amount of boric acid from 9% to 4% and in order to maintain the same pH values of 7.8 to 8.3, 8% mannitol must be added.

It also follows from the above data that a more concentrated suspension of the mannitol-boric acid-sodium perborate mixture will produce a lower pH value. A 10% aqueous suspension of #2 Dentifrice will have a pH value of 8.3; a 30% suspension, a pH value of 7.8.

In determining the amount of boric acid and mannitol to be added to a dentifrice, it is necessary to take into consideration the quantity of dentifrice generally used, and its concentration after dilution with saliva and the water present in a moistened tooth brush. From practical experience, it has been found that the concentration of this suspension of dentifrice varies from 10% to 30%.

Mannitol and other hexahydric alcohols increase the neutralizing power of an acidic substance in the presence of sodium perborate. The quantity of an acidic substance to be added to sodium perborate in order to obtain a desired pH may be reduced provided that mannitol or any other hexahydric alcohol is present. For example, a 3% aqueous solution of sodium perborate monohydrate has a pH value of 10.14. The addition of 1.2% sodium di-hydrogen phosphate monohydrate to the above solution will reduce the pH value from 10.14 to 8.86. However, if 2.1% mannitol is added to the above mixture of sodium perborate and sodium di-hydrogen phosphate monohydrate, the pH value of the mixture will decrease from 8.86 to 8.30.

Similarly, a solution of 3% sodium perborate monohydrate and 0.9% sodium aluminum sulfate has a pH value of 8.92. The addition of 2.1% mannitol to this mixture will reduce the pH value from 8.92 to 8.30.

This property of mannitol to increase the titratable acidity of a solution or suspension is attributed to the reaction between the acidic substance and sodium perborate liberating free boric acid, which in turn reacts with the mannitol present to form a complex that is more acidic than boric acid itself.

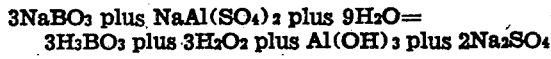

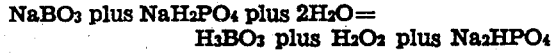

The alkalinity produced in the hydrolysis of sodium perborate can be neutralized by the addition of borax and mannitol. The borax is known to hydrolyze to liberate free boric acid which combines with the mannitol present to form the acidic mannitol-boric acid complex.

It is to be understood that the invention is not limited to the precise construction set forth, but that it includes within its purview whatever changes come fairly within either the terms or the spirit of the appended claims.

We claim:
1. A dentifrice comprising an oxygen-supplying component chosen from the group consisting of peroxides, percarbonates, perborates of the alkali and alkaline earth metals and a complex compound containing hydrogen peroxide with salts of the alkali or alkaline earth metals which reacts with the water present during dentifrice use to liberate oxygen with the formation of an alkali; boric acid; and a solid straight chain hexahydric alcohol which will combine with the boric acid in the presence of the water present during dentifrice use to form a reagent of substantially greater acidity than the boric acid, the boric acid and alcohol being present in proportions appropriate to produce a predetermined alkalinity in the products of reaction of the reagent with said alkali.

2. A dentifrice as set forth in claim 1 in which the alcohol is a hexahydric alcohol.

3. A dentifrice as set forth in claim 1 in which the alcohol is mannitol.

4. A dentifrice as set forth in claim 1 in which said predetermined alkalinity has a hydrogen ion concentration value between 7.5 and 9.

5. A dentifrice as set forth in claim 1 in the form of a dry relatively stable powder, comprising an intimate mixture of the oxygen-supplying component, the boric acid and the alcohol in finely divided form, the components of which mixture will react in the presence of the amount of water present during normal use of the powder as a dentifrice.

6. A dentifrice as set forth in claim 1 in which the oxygen-supplying component is a perborate.

7. A dentifrice as set forth in claim 1 in which the oxygen-supplying component is sodium perborate and the alcohol is mannitol.

A. L. OMOHUNDRO.
EMIL CONRAD FANTO.